United States Patent
Fischer et al.

(10) Patent No.: US 10,863,352 B2
(45) Date of Patent: *Dec. 8, 2020

(54) SYSTEM FOR WIRELESS NETWORK ACCESS CONTROL IN AN AIRCRAFT

(71) Applicant: Airbus Operations GmbH, Hamburg (DE)

(72) Inventors: Wolfgang Fischer, Hamburg (DE); Jan Mueller, Hamburg (DE); Ulrich Rittner, Hamburg (DE); Michael Netzler, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/548,475

(22) Filed: Aug. 22, 2019

(65) Prior Publication Data
US 2019/0379584 A1 Dec. 12, 2019

Related U.S. Application Data

(63) Continuation of application No. 15/382,943, filed on Dec. 19, 2016, now Pat. No. 10,425,286.

(30) Foreign Application Priority Data

Dec. 18, 2015 (EP) .................................. 15201211

(51) Int. Cl.
*H04L 12/24* (2006.01)
*H04W 12/06* (2009.01)
(Continued)

(52) U.S. Cl.
CPC ............ *H04W 12/06* (2013.01); *H04L 41/12* (2013.01); *H04L 63/18* (2013.01); *H04L 67/12* (2013.01); *H04W 4/80* (2018.02); *H04W 84/12* (2013.01)

(58) Field of Classification Search
CPC ......... H04L 41/12; H04L 67/12; H04L 63/18; H04W 4/80
See application file for complete search history.

(56) References Cited

U.S. PATENT DOCUMENTS

2004/0235469 A1* 11/2004 Krug ..................... H04W 84/00
455/431
2006/0114337 A1* 6/2006 Rothschild ......... H04N 1/32144
348/231.3
(Continued)

FOREIGN PATENT DOCUMENTS

| DE | 102012203032 | 8/2013 |
|----|--------------|--------|
| EP | 2528297 | 11/2012 |
| WO | 2015163774 | 10/2015 |

OTHER PUBLICATIONS

European Search Report, dated May 31, 2016, priority document.
(Continued)

*Primary Examiner* — Asad M Nawaz
*Assistant Examiner* — Syed Ali
(74) *Attorney, Agent, or Firm* — Greer, Burns & Crain, Ltd.

(57) ABSTRACT

A network access control method involves requesting access to a network via a wireless communication adapter for a personal electronic device. Then, an acoustic audio code output by an audio signaling device connected to the wireless communication adapter by wire is acoustically captured by the personal electronic device. A digital representation of the captured acoustic audio code is submitted from the personal electronic device to the wireless communication adapter via wireless communication. Subsequently, the wireless communication adapter authenticates the personal electronic device on the basis of the submitted digital representation of the captured acoustic audio code.

10 Claims, 1 Drawing Sheet

(51) Int. Cl.
　　*H04W 4/80* (2018.01)
　　*H04L 29/06* (2006.01)
　　*H04L 29/08* (2006.01)
　　*H04W 84/12* (2009.01)

(56) References Cited

U.S. PATENT DOCUMENTS

| | | | |
|---|---|---|---|
| 2006/0212433 A1* | 9/2006 | Stachowiak | G06F 16/3344 |
| 2007/0081661 A1* | 4/2007 | Korah | H04M 1/271 |
| | | | 379/355.01 |
| 2007/0127439 A1* | 6/2007 | Stein | H04M 7/1215 |
| | | | 370/352 |
| 2008/0304747 A1* | 12/2008 | Marinkovich | G11B 27/105 |
| | | | 382/183 |
| 2010/0156171 A1 | 6/2010 | Sechrist | |
| 2011/0202338 A1* | 8/2011 | Inghelbrecht | G10L 15/193 |
| | | | 704/231 |
| 2012/0045994 A1 | 2/2012 | Koh et al. | |
| 2012/0168262 A1* | 7/2012 | Finschi | B66B 1/467 |
| | | | 187/392 |
| 2013/0281106 A1* | 10/2013 | Lynch | H04B 7/18508 |
| | | | 455/452.1 |
| 2014/0087696 A1 | 3/2014 | Gressus et al. | |
| 2014/0187149 A1 | 7/2014 | Lortz et al. | |
| 2014/0324299 A1* | 10/2014 | Sorensen | B60R 16/037 |
| | | | 701/49 |
| 2014/0380501 A1 | 12/2014 | Niss | |
| 2015/0120097 A1 | 4/2015 | Hathaway | |
| 2015/0132010 A1* | 5/2015 | Brownjohn | H04B 10/27 |
| | | | 398/140 |
| 2015/0163848 A1* | 6/2015 | Lin | H04B 7/18506 |
| | | | 370/329 |
| 2015/0203216 A1 | 7/2015 | Goldstein et al. | |
| 2015/0264175 A1* | 9/2015 | Bumarch, III | G10L 15/22 |
| | | | 379/88.01 |
| 2015/0327061 A1* | 11/2015 | Haddad | H04W 4/21 |
| | | | 455/411 |
| 2015/0349875 A1* | 12/2015 | Lauer | H04B 7/18506 |
| | | | 370/316 |
| 2015/0351066 A1* | 12/2015 | Lauer | H04W 60/04 |
| | | | 455/405 |
| 2015/0365401 A1* | 12/2015 | Brown | H04L 63/083 |
| | | | 726/7 |
| 2016/0007169 A1 | 1/2016 | Margis | |
| 2016/0012465 A1* | 1/2016 | Sharp | G06Q 20/10 |
| | | | 705/14.17 |
| 2016/0019732 A1 | 1/2016 | Fournier et al. | |
| 2016/0119052 A1 | 4/2016 | Frerking et al. | |
| 2016/0119938 A1 | 4/2016 | Frerking et al. | |
| 2016/0176538 A1 | 6/2016 | Bekanich | |
| 2017/0106997 A1 | 4/2017 | Bekanich | |
| 2017/0126625 A1 | 5/2017 | Haak et al. | |
| 2017/0144773 A1 | 5/2017 | Raman | |
| 2017/0317975 A1 | 11/2017 | Olive et al. | |

OTHER PUBLICATIONS

God, R; Hintze, H.: "Drahtlose Kommunikation in der Flugzeugkabine für effiziente Arbeitsabläufe und Passagierdienstleistungenn", MKWI 2010 Multikonferenz Wirtschaftsinformatik, Göttingen, Feb. 23-25, 2010, p. 2361-2374.

* cited by examiner

SYSTEM FOR WIRELESS NETWORK ACCESS CONTROL IN AN AIRCRAFT

CROSS-REFERENCES TO RELATED APPLICATIONS

This application is a continuation of U.S. application Ser. No. 15/382,943 filed on Dec. 19, 2016, which claims the benefit of the European patent application No. 15201211.8 filed on Dec. 18, 2015, the entire disclosures of which are incorporated herein by way of reference.

FIELD OF THE INVENTION

The present invention pertains to a method for controlling wireless network access, particularly access to a network of an aircraft, a system for controlling wireless network access of a personal electronic device to an aircraft network, and the use of a wireless network access control system in the passenger cabin of an aircraft.

Although applicable for any kind of network, the present invention and the corresponding underlying problems will be explained in further detail in conjunction with a network wirelessly accessible in the passenger cabin of an aircraft.

BACKGROUND OF THE INVENTION

Personal electronic devices (PEDs) become increasingly widespread. Usually those PEDs get carried around along with the user wherever he travels, including on board of aircraft. Considering the manifold communication interfaces which such PEDs comprise it is desirable to provide passengers on board an aircraft with access to the different networks of the aircraft, for example a wireless local area network (WLAN). Mobile content distribution networks on board of aircraft allow extending comfort amenities and services such as internet access, on-board shopping opportunities and access to in-flight entertainment (IFE) systems. For example, the document God, R; Hintze, H.: "Drahtlose Kommunikation in der Flugzeugkabine für effiziente Arbeitsablaufe and Passagierdienstleistungen", MKWI 2010 Multikonferenz Wirtschaftsinformatik, Göttingen, Feb. 23-25, 2010, p. 2361-2374 discloses the use of non-contact aircraft cabin interfaces for network access of electronic devices employing smart card, RFID and near field communication (NFC) technology.

Apart from providing wireless network access to passengers of the aircraft, cabin crew members may also benefit from being able to wirelessly connect specific mobile devices to the aircraft network. Since cabin crew members regularly have a higher level of role authorization in a role-based access control policy of an aircraft network it is desirable to establish a reliable authentication procedure for safely restricting wireless access of electronic devices to the aircraft network to those devices that may be guaranteed to belong to cabin crew members.

One of the challenges associated with managing network access to networks on board of an aircraft pertains to the wide range of electronic devices requesting access which are, a priori, not always known to the network. A network access control system therefore needs to employ elaborate access control schemes to be able to reliably identify and authenticate electronic devices in order to selectively authorize and approve operations of the electronic devices in the network and hold the authenticated user of the electronic devices accountable for such operations.

Common measures for identification and authentication of an electronic device requesting access to a network element involve the exchange of authentication codes between the device and the network element and the subsequent validation of the presented codes. Such codes may, for example, include knowledge-based passphrases (for example passwords, PIN codes or pre-assigned user information such as ticket or customer numbers), pre-validated information inherently tied to the device or tokens and fobs physically located in the vicinity of the device (for example a MAC address of the device or a digital authenticity certificate for the device), or inherent user-based coded parameters (for example biometric user identification information such as fingerprints, retina patterns, DNA information or behavioral characteristics).

Several different approaches for access control procedures of electronic devices to network elements of vehicles are known in the prior art: Document DE 10 2012 203 032 A1 discloses an authentication method for an electronic device of an aircraft passenger based on flight specific pre-assigned authentication data. Document US 2014/0187149 A1 discloses the use of dynamically created uniform resources identifiers to redirect an electronic device to a remote authentication system for verifying access credentials of the electronic device to access a network element of a vehicle. Document WO 2015/163774 A1 discloses a multi-factor authentication scheme for access control of a user to a system based on acoustically convolved audio passphrases of different origin.

SUMMARY OF THE INVENTION

It is one object of the invention to provide solutions for establishing wireless network access only for identified and safely authenticated electronic devices. Those solutions should require less effort for managing and updating access credentials and should be easy to set up in conventional network surroundings, specifically on board of aircraft.

According to a first aspect of the invention, a network access control method comprises requesting access to a network via a wireless communication adapter for a personal electronic device. Then, an acoustic audio code output by an audio signaling device connected to the wireless communication adapter by wire is acoustically captured by the personal electronic device. A digital representation of the captured acoustic audio code is submitted from the personal electronic device to the wireless communication adapter via wireless communication. Subsequently, the wireless communication adapter authenticates the personal electronic device on the basis of the submitted digital representation of the captured acoustic audio code.

According to a second aspect of the invention, an aircraft network comprises at least one network gateway, an audio signaling device connected to the network gateway by wire, and a wireless communication adapter connected to the network gateway by wire. The wireless communication adapter is configured to cause the audio signaling device to output an acoustic audio code to a personal electronic device requesting access to the network via the wireless communication adapter, to receive a digital representation of the acoustic audio code captured by the personal electronic device via wireless communication, and to authenticate the personal electronic device on the basis of the submitted digital representation of the captured acoustic audio code.

According to a third aspect of the invention, an aircraft comprises a network according to the second aspect of the invention.

According to a fourth aspect of the invention, a network access control method according to the first aspect of the invention is used for controlling wireless network access of a personal electronic device to a network of an aircraft.

One idea of the present invention is to identify and authenticate personal electronic devices, for example cabin crew members' or flight attendants' PEDs, which request wireless access to an aircraft network on the basis of audio codes that are output under control of a network component to the electronic devices. The personal electronic devices are configured to acoustically capture the audio codes output on-demand from a trusted source of the aircraft network, for example by microphone. The captured audio codes may then be used by the personal electronic devices as access credentials for establishing a wireless access channel to the aircraft network.

Due to the audio codes being generated on-demand as access credentials, the specifics of the credentials do not need to be memorized or kept in digital storage by the user of the personal electronic device. Thus, it will advantageously be easier for cabin crew members to wirelessly connect to the aircraft network since they do not need to memorize one or possibly more passwords or passkeys for authentication purposes. Moreover, the elimination of the need for static passwords or passkeys—which might be prone to accidental or malevolent exposure to unauthorized third parties—enhances the safety of the aircraft network.

On the other hand, the access credentials may be dynamically created by the aircraft network components so that there advantageously is no particular need for a pre-configured access control list that would require extensive maintenance and regular updates to account for changes in the murth of authorized electronic devices possibly trying to gain wireless network access.

When the audio codes are output on-demand and physically captured by the electronic devices, a certain physical vicinity of the electronic devices to the wireless network elements and specifically the audio signaling devices for outputting the audio codes need to be established. This decreases the risk of man-in-the-middle attacks or pure replay attacks on the aircraft network by malicious intruders.

Particularly for a cabin environment of a passenger aircraft, the aircraft systems require little costly and complex refurbishment in order to implement the necessary network components for the wireless network access control scheme. Conventional wired handsets located at various locations in the cabin may be employed as audio signaling devices for outputting the audio codes under control of central wireless network elements or locally installed wireless communication adapters.

In addition to identification and authentication functionalities, a user role policy management may be implemented by discerning between different audio signaling devices at various locations within the aircraft. For example, different PEDs wirelessly connected to the wireless communication adapters may be assigned different roles based on the type or location of the wired handset from which they were identified and authenticated.

According to an embodiment of the method, the method may further comprise outputting, by the wireless communication adapter, a control signal to the audio signaling device to cause the audio signaling device to output the acoustic audio code.

According to a further embodiment of the method, the control signal may be sent via a network gateway of the network to which both the wireless communication adapter and the audio signaling device are connected by wire.

According to another embodiment of the method, the method may further comprise establishing a wireless communication link between the wireless communication adapter and the personal electronic device when the personal electronic device has been successfully authenticated by the wireless communication adapter.

According to a further embodiment of the method, the audio signaling device may comprise a wired handset with a loudspeaker.

According to a further embodiment of the method, acoustically capturing the acoustic audio code may involve capturing the acoustic audio code with a microphone of the personal electronic device.

According to a further embodiment of the method, the acoustic audio code may comprise one or a combination of a series of audible tones, a soundwave, a snippet of music, spoken words and spoken alphanumeric codes.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
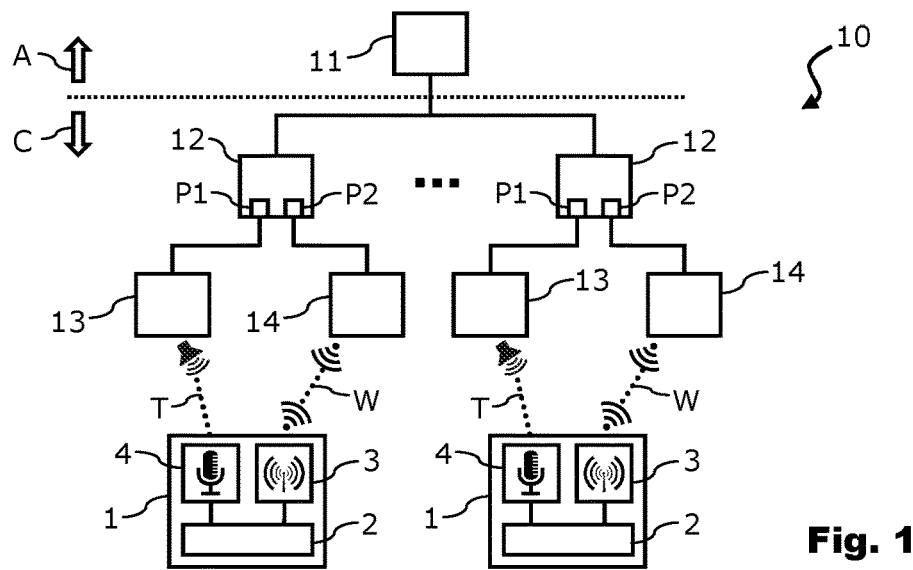
FIG. 1 schematically illustrates a functional diagram of an aircraft network according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

DETAILED DESCRIPTION OF THE PREFERRED EMBODIMENTS

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Personal electronic devices (PEDs) within the meaning of the present invention comprise all electronic devices which may be employed for entertainment, communication and/or office purposes. For example, PEDs may comprise all sorts of end terminals, such as laptops, mobile phones, smartphones, handheld devices, palmtops, tablet PCs, GPS devices, navigation devices, audio devices such as MP3 players, portable DVD or Bluray® players or digital cameras.

Figure 3:
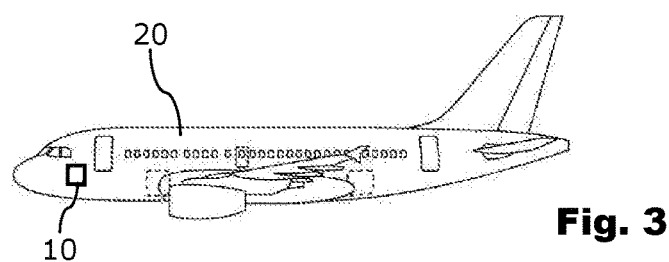
FIG. 3 schematically illustrates an aircraft comprising an aircraft network according to a further embodiment of the invention.

FIG. 1 schematically illustrates a functional diagram of an aircraft network 10. The aircraft network 10 may be installed in an aircraft, for example a passenger aircraft 20 as illustrated in FIG. 3. The aircraft network 10 may, for example, be a microprocessor controlled data bus system for the control, operation and testing of passenger address (PA), cabin interphone, passenger call, passenger lighted signs, general illumination and/or emergency evacuation signaling. The aircraft network 10 may include components that permit the pilot and flight attendants to relay audio communication to passengers of the aircraft and/or to activate certain visual signaling devices.

The aircraft network 10 may comprise a network management server 11 as core element in the avionics bay section A of an aircraft. One or more network gateways 12 may act as decoding devices to convert digital communication signals from the network management server 11 to analog output signals that may be transmitted into the passenger cabin. In some cases, the network gateways 12 may also act as encoding devices to convert analog input signals captured by cabin components to digital communication signals for the network management server 11 to process. For example, one or more visual or audio signal components that are located at designated locations within the aircraft may be connected by wire to the network gateways 12. The network gateways 12 may be distributed within the aircraft cabin C, for example near the exit doors, as well in relative vicinity to the connected visual or audio signal components. Such visual or audio signal components may for example comprise PA loudspeakers, "Fasten Seatbelt" signs, emergency exit signs, passenger lighted signs, reading lights, cabin illumination devices, lavatory occupation signs, area call panels, slide and door pressure sensors, attendant indicator panels, and/or attendant handsets for use by the cabin crew.

As an exemplary component, an audio signaling device 13, for example a wired handset for cabin crew use, is shown to be connected by wire at a first wired interface port P1 of the network gateways 12. The interface port P1 may for example be a D-subminiature socket. The different wired handsets may be distributed throughout the aircraft and may fulfil different roles, such as, for example, a "purser" station handset, a "forward galley" station handset or an "upper deck aft" handset, depending on the location of the respective handsets. By virtue of the network gateway 12, flight attendants are able to address passengers using the handset 13 located at one of the flight attendant stations, with the network management server 11 distributing the voice signals from the flight attendants spoken into the handset 13 to PA loudspeakers in the cabin. The wired handset 13 may be implemented as a telephone receiver with press buttons, a display, a microphone part and/or a loudspeaker part.

A wireless communication adapter 14 is connected to the network gateways 12, for example by wired connection to an interface port P2 of the network gateways 12. The interface port P2 may, for example, be a second interface port and may in some instances comprise a D-subminiature socket. The interface port P2 may also be implemented integrally with the first interface port P1. In other words, the wireless communication adapter 14 and the wired handset 13 may share the same interface port at the network gateway 12. The wireless communication adapter 14 includes RF transceiver means to transmit and receive RF signals via a wireless communication protocol, such as Bluetooth®, WiFi, WiMAX, or similar protocols. The wireless communication adapter 14 is able to act as a wireless access point to establish, maintain and manage a wireless communication channel with one or more mobile wireless communication devices.

The cabin crew or flight attendants might want to use personal electronic devices, PEDs 1, to connect to the wireless communication adapter 14 via a wireless communication link W. To establish the link and safeguard the aircraft network from access by unauthorized third party devices, the wireless communication adapters 14 need to identify and authenticate the PEDs 1 at first. To that end, the wireless communication adapters 14 may perform a network access control procedure when a PED 1 requests wireless access to the aircraft network 10.

Figure 2:
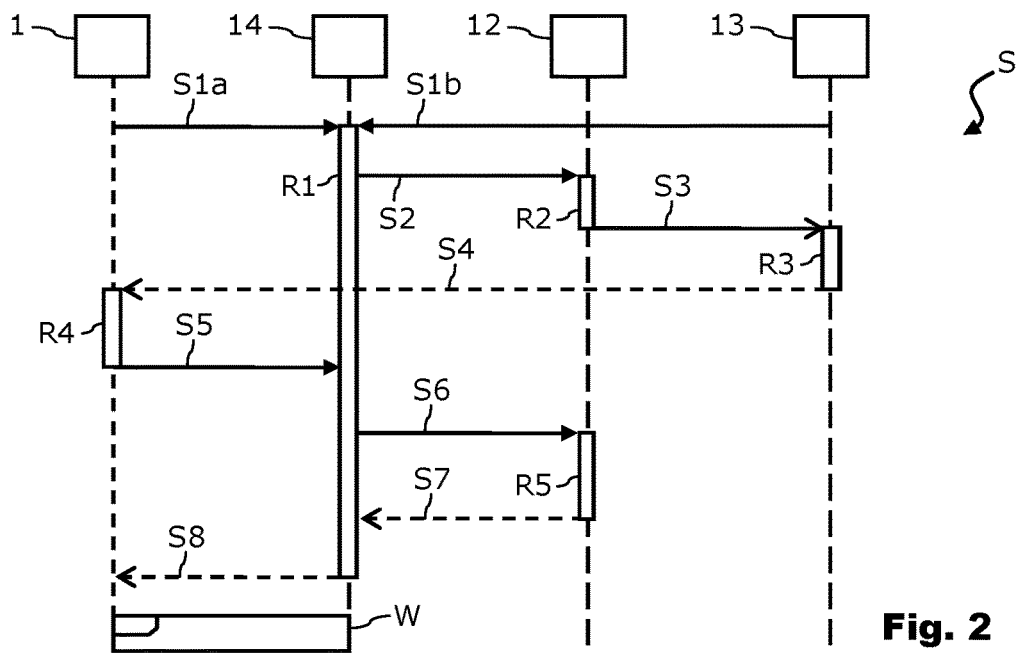
FIG. 2 schematically illustrates a sequence diagram of a network access control procedure according to another embodiment of the invention.

FIG. 2 shows a sequence diagram S of a network access control procedure. The network access control procedure may be employed to identify and authenticate a personal electronic device (PED) that requests access to an aircraft network, such as, for example, the aircraft network 10 as depicted in and explained in conjunction with FIG. 1. The network access control procedure may be used in an aircraft network 10 that may be implemented in an aircraft, for example a passenger aircraft 20 as depicted in and explained in conjunction with FIG. 3. The network access control procedure may be particularly employed for restricting wireless communication access to a wireless communication adapter 14 in an aircraft network 10 to authorized PEDs 1 of cabin crew members in an aircraft 20.

A user of a PED 1 may want to request access to an aircraft network 10. In order to do so, it may be possible to send a request message S1a directly via an RF transceiver unit 3 of the PED 1 to a wireless communication adapter 14 of the network. Alternatively, it may be possible to send the request via an internal intercom message S1b transmitted via an audio signaling device 13, for example a wired handset 13 with a loudspeaker, to the wireless communication adapter 14. In the latter case, the intercom message S1b may be relayed via a network gateway 12 to which both the wireless communication adapter 14 and the audio signaling device 13 are connected by wire. Instead of using only the network gateway 12 to which both the wireless communication adapter 14 and the audio signaling device 13 are connected by wire, it may also be possible to relay the intercom message S1b onwards to the network management server 11. The network management server 11 may then be able to relay messages between a wireless communication adapter 14 and an audio signaling device 13 connected to different network gateways 12 within the aircraft network 10.

In response to the receipt of either of the access request messages S1a or S1b, the wireless communication adapter 14 may initiate an identification and authentication routine R1. In order to authenticate the PED 1, the wireless communication adapter 14 may output a control signal S2 to the network gateway 12 which in turn may forward the control signal S2 to the audio signaling device 13, or alternatively may generate a dependent control signal S3. The relaying routine R2 may be part of the conventional intercom routine R2 for communication between connected devices to the interface ports of the network gateway 12. Instead of using only the network gateway 12 to which both the wireless communication adapter 14 and the audio signaling device 13 are connected by wire, it may also be possible to relay the control signals S2 and S3 via the network management server 11. The network management server 11 may then be able to relay the control signals S2 and S3 between a wireless communication adapter 14 and an audio signaling device 13 connected to different network gateways 12 within the aircraft network 10.

The control signals S2 and/or S3 cause the audio signaling device 13 to output the acoustic audio code. The acoustic audio code may, for example, comprise one or a combination of a series of audible tones, a soundwave, a snippet of music, spoken words and spoken alphanumeric codes. Such audio codes may be preinstalled on the wireless communication adapter 14, the audio signaling device 13, the network gateway 12 or the network management server 11, or may be generated dynamically by the wireless communication adapter 14, the network gateway 12, the network management server 11 or the audio signaling device 13. It may, for example, be possible to encode information pertaining to the PED 1 requesting network access into the acoustic audio code for identification purposes. In that regard, the acoustic characteristics of the audio code may be altered depending on the information specific to the requesting PED 1.

The audio code may be output as acoustic transmission S4 to the PED 1 by the audio signaling device 13, for example via the loudspeaker of a wired handset 13. The PED 1 then acoustically captures the acoustic audio code output by the audio signaling device 13. It may be possible to synchronize the acoustic transmission S4 of the audio signaling device 13 with the recording capabilities of the PED 1. To that end, it may be possible for a user to manually enter a confirmation signal into the audio signaling device 13 to start or repeat the acoustic audio code output when a microphone 4 of the PED 1 is ready to capture the acoustic audio code. For example, it may be possible to install a dedicated application or other piece of software on the PED 1 that may be executed by a microprocessor 2 of the PED 1 and that is able to decode the acoustic audio code in order to retrieve information encoded therein for submission to the wireless communication adapter 14.

Once the acoustic audio code has been captured in a capturing routine R4, a digital representation S5 of the captured acoustic audio code is submitted from the RF transceiver unit 4 of the PED 1 to the wireless communication adapter 14 via wireless communication W. The digital representation S5 may be formatted in a way prescribed by the wireless communication adapter 14 and may conform to the desired wireless communication standard with the wireless communication adapter 14. The wireless communication adapter 14 either identifies and authenticates the PED 1 on the basis of the submitted digital representation of the captured acoustic audio code on its own, or it may send an authentication request S6 to the network gateway 12 for identification and authentication R5 at the network gateway 12. The network gateway 12 may then send an authorization approval message S7 back to the wireless communication adapter 14 so that the wireless communication adapter 14 may establish a wireless communication link W between the wireless communication adapter 14 and the PED 1. The wireless communication link W for the PED 1 may in this case also be under the control of the dedicated application or other software installed on the PED 1.

With the wireless communication link W established, the user—for example a flight attendant—may perform the same actions with the PED 1, such as cabin intercom, passenger address or similar, as a user might be able to perform using the wired handset 13. However, with the use of the PED 1, a greater flexibility, enhanced functionality and more elaborated user role policy management schemes may be achieved. It may further be possible for the PED 1 to gain access to other functions in the aircraft network 10 via the wireless communication link W. For example, the PED 1 may be used to access an AAP or AIP interface allowing the flight attendant to perform corresponding functions in those interfaces.

One of the advantages associated with the systems and methods for wireless network access control as disclosed herein is that there are no further hardware modifications in the aircraft network 10 required to authenticate PEDs 1 requesting wireless access to the network.

In the foregoing detailed description, various features are grouped together in one or more examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification. In particular, the embodiments and configurations described for the composite reinforcement components and structural elements can be applied accordingly to the aircraft or spacecraft according to the invention and the method according to the invention, and vice versa.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft network comprising: at least one network gateway; an audio signaling device connected to the network gateway by wire; and, a wireless communication adapter connected to the network gateway by wire, the wireless communication adapter being configured to:
receive a request to allow a personal electronic device to access the aircraft network;
cause the audio signaling device to output an acoustic audio code to the personal electronic device, via the wireless communication adapter, in response to the request for access to the aircraft network;
capture the acoustic audio code with a microphone of the personal electronic device, and wherein the acoustic audio code comprises one or a combination of a series of audible tones, a soundwave, a snippet of music, spoken words and spoken alphanumeric codes;

receive a digital representation of the acoustic audio code captured by the personal electronic device via wireless communication; and authenticate the personal electronic device on the basis of the submitted digital representation of the captured acoustic audio code; and, establish a wireless communication link between the wireless communication adapter of the network and the personal electronic device when the personal electronic device has been successfully authenticated by the wireless communication adapter.

2. The aircraft network of claim 1, wherein the wireless communication adapter is further configured to send a control signal via the network gateway to the audio signaling device to cause the audio signaling device to output the acoustic audio code.

3. The aircraft network of claim 2, wherein the control signal is sent via a network gateway of the aircraft network to which both the wireless communication adapter of the aircraft network and the audio signaling device are connected by wire.

4. The aircraft network of claim 1, wherein the wireless communication adapter is further configured to establish a wireless communication link between the wireless communication adapter and the personal electronic device when the personal electronic device has been successfully authenticated by the wireless communication adapter.

5. The aircraft network of claim 1, wherein the audio signaling device comprises a wired handset with a loudspeaker.

6. An aircraft comprising:
an aircraft network, the aircraft network comprising:
at least one network gateway; an audio signaling device connected to the network gateway by wire; and,
a wireless communication adapter connected to the network gateway by wire, the wireless communication adapter being configured to:
receive a request to allow a personal electronic device to access the aircraft network;
cause the audio signaling device to output an acoustic audio code to the personal electronic device, via the wireless communication adapter, in response to the request for access to the aircraft network via the wireless communication adapter;
capture the acoustic audio code with a microphone of the personal electronic device, and wherein the acoustic audio code comprises one or a combination of a series of audible tones, a soundwave, a snippet of music, spoken words and spoken alphanumeric codes;
receive a digital representation of the acoustic audio code captured by the personal electronic device via wireless communication;
authenticate the personal electronic device on the basis of the submitted digital representation of the captured acoustic audio code; and,
establish a wireless communication link between the wireless communication adapter of the network and the personal electronic device when the personal electronic device has been successfully authenticated by the wireless communication adapter.

7. The aircraft of claim 6, wherein the wireless communication adapter is further configured to send a control signal via the network gateway to the audio signaling device to cause the audio signaling device to output the acoustic audio code.

8. The aircraft of claim 7, wherein the control signal is sent via a network gateway of the aircraft network to which both the wireless communication adapter of the aircraft network and the audio signaling device are connected by wire.

9. The aircraft of claim 6, wherein the wireless communication adapter is further configured to establish a wireless communication link between the wireless communication adapter and the personal electronic device when the personal electronic device has been successfully authenticated by the wireless communication adapter.

10. The aircraft of claim 6, wherein the audio signaling device comprises a wired handset with a loudspeaker.

* * * * *